United States Patent [19]

Reussner

[11] 3,968,263
[45] July 6, 1976

[54] BEVERAGE MIX AND METHOD
[75] Inventor: George H. Reussner, Pearl River, N.Y.
[73] Assignee: General Foods Corporation, White Plains, N.Y.
[22] Filed: Nov. 29, 1974
[21] Appl. No.: 528,531

Related U.S. Application Data
[63] Continuation-in-part of Ser. No. 360,215, May 14, 1973, abandoned.

[52] U.S. Cl. .............................. 426/250; 426/590
[51] Int. Cl.² ........................................ A23L 2/02
[58] Field of Search ............ 426/590, 591, 599, 74; 424/57; 423/307–309, 311–313, 314, 315

[56] References Cited
UNITED STATES PATENTS
2,154,168  4/1939  Klein et al. .................. 424/57 X
2,332,735  10/1943  Lyons .................. 424/57
3,114,641  12/1961  Sperti et al. .................. 424/57

Primary Examiner—A. Louis Monacell
Assistant Examiner—R. B. Penland
Attorney, Agent, or Firm—Thaddius J. Carvis

[57] ABSTRACT

The degree of tooth enamel demineralization occurring due to the consumption of a highly acid, low pH beverage is reduced according to the present invention. This is accomplished by adding to the beverage from 1.0 to 6.0 grams per quart, and preferably from 1.25 to 2.5 grams per quart of tricalcium phosphate.

10 Claims, No Drawings

BEVERAGE MIX AND METHOD

BACKGROUND OF THE INVENTION

This application is a continuation in part of U.S. Ser. No. 360,215, filed May 14, 1973, now abandoned.

The present invention relates to low pH beverages, and, more particularly, to an additive for low pH beverages which reduces the degree of tooth enamel dimineralization caused by the frequent consumption of large amounts of beverages of this type.

Recent studies with rats, accepted by those skilled in the art as standard laboratory animals, have indicated that continued consumption of low pH beverages, whether natural or artificial, can result in a generalized dimineralization of teeth. See in this regard, for example: Wagg et al. *British Dental Journal*, vol. 119, no. 3, pages 118–123, Aug. 3, 1965; and McDonald Jr., et al, *J. Dent. Res.*, March—April 1973, pages 211—216.

Some investigators have indicated that certain phosphates such as calcium phosphates may inhibit this form of demineralization or may in fact, effect remineralization of teeth demineralized in this manner. In this regard, see for example: Wagg et al., supra; Pickel et al., *The Alabama Journal of Medical Sciences*, vol 2, no. 3, July 1965; Silverstone et al., *Caries Research*, 5:323–342, 1971; and U.S. Pat. No. 3,375,168 to J.H. Curtin et al. In a specific example, an article by T. Koulourides appearing in Harris, R. S., *Art and Science of Dental Caries Research*, 1968, pages 355 –378, suggests employing tricalcium phosphate at levels of less than about 0.3 grams/quart (i.e., $[Ca^{++}]$ = 3.0mM/liter), to a near neutral aqueous solution to obtain a solution for use in remineralizing tooth enamel in an in vitro system. None of these references, however, provides guidance to one skilled in the art to a truly effective tooth enamel demineralization preventing agent for use in highly acid, low pH beverages and beverage mixes.

Other workers have added calcium phosphates to foods for reasons of taste and handling. See for example: U.S. Pat. No. 3,020,213 to W. A. Tidridge et al; U.S. Pat. No. 2,514,973 to W. L. Robinson; and U.S. Pat. No. 2,851,361 to Diller et al. Specifically, tricalcium phosphate has for some time been added to powdered beverage concentrates, in an amount providing less than about 0.90 grams per quart of final beverage, to provide a greater flowability to the dry powder. While these workers have employed calcium phosphates in foods, they were not concerned with tooth enamel demineralization.

SUMMARY OF THE INVENTION

It is an object of the present invention to economically and effectively reduce the degree of tooth enamel demineralization caused by consumption of highly acid, low pH beverages.

It is another object of the present invention to provide a dry mix for forming a highly acid low pH beverage which upon hydration will result in decreased tooth enamel demineralization as compared with a beverage prepared from a dry mix not formulated in accordance with the present invention.

It is yet another object of the present invention to provide an improved method for preparing highly acid low pH beverages which will provide a beverage which results in decreased tooth enamel demineralization as compared with a beverage not formulated in accordance with the present invention.

These and other objects are accomplished according to the present invention which is based upon the discovery that the addition of from about 1.0 to 6.0, and more preferably 1.25 to 2.5, grams of tricalcium phosphate per quart of a highly acid, low pH beverage, or quantity of mix for preparing 1 quart of a highly acid low pH beverage, will reduce the degree of tooth enamel demineralization normally occurring due to the consumption of the beverage.

DETAILED DESCRIPTION OF THE INVENTION

For the purposes of the present invention a low pH beverage is defined as one having an acid pH, preferably below about 6, and typically from about 2.5 to about 3.5. Most preferably these beverages contain sufficient edible acid, such as citric, and sufficient buffer, such as potassium or sodium citrate, to bring the pH to within the range of from about 2.8 to about 3.3.

It is noted that levels of tricalcium phosphate contemplated by the present invention may cloud beverage solutions; however, cloud is to be desired for natural appearance in citrus-type flavors. Moreover, the improvement to dental health provided by the present invention far outweighs any disadvantage due to the presence of such cloud.

Low pH beverages and beverage mixes are well known. Typically these beverages comprise an aqueous solution of a flavorant, a colorant, a sweetener and a food acidulent. Typical of the food acidulents which can be employed are citric, malic, and fumaric acids. Citric acid is preferred. Other conventional food acidulents may, of course, be employed. According to this invention, one or a combination of these edible acids is employed at a concentration of from about 0.08 to about 0.2 gram equivalents per quart of beverage. Preferably the acid is present at a level of from about 0.10 to about 0.16 gram equivalents per quart. Suitable buffering agents are necessarily employed, when using these relatively high acid levels, to obtain a pH within the indicated ranges.

A wide variety of flavorants are known for use in beverages of the kind considered here. Typical of these are natural and artificial flavorants such as cherry, strawberry, grape, orange, lemon, lime, root beer, cola, raspberry, grapefruit, fruit punch, and the like which are employed in suitably effective amounts.

Likewise, any of the known, non-toxic natural or synthetic sweeteners can be employed. Of the natural sweeteners, sucrose is the most common; however, other sugars such as fructose, dextrose, etc.; certain amino acids such as L-alanine and glycine; certain alcohols such as sorbitol, mannitol and xylitol; and certain vegetable extracts such as glycyrrhize globra; and the like, can be employed. Exemplary of the synthetic sweeteners which can be employed are saccharin, cyclamate salts, certain dipeptides and their salts such as L-aspartyl-L-phenylalanine methyl ester, and the like.

Beverages of this kind can also include various food and nutritional supplements such as vitamins and minerals. Vitamins A and C are typical of such additives.

A typical beverage mix employing the tooth enamel erosion reducing composition of the present invention has the following formulation on a dry basis:

| Ingredient | Parts by Weight |
|---|---|
| Sucrose | 89.28 |
| Citric Acid | 5.53 |
| Clouding Agent | 2.28 |
| Sodium Carboxymethyl Cellulose (low viscosity) | 0.90 |
| Tricalcium Phosphate | 1.25 |
| Trisodium Citrate (Sodium Citrate) | 0.70 |
| Vitamin C | 0.47 |
| Tenfold Orange Oil | 0.26 |
| Vitamin A | 0.04 |
| Color (Mixture of F.D. & C. No. 5 and F.D. & C. No. 6 yellow) | 0.01 |

Sixty-six grams of the above beverage mix is reconstituted in a pint of water to provide a pleasing beverage.

According to the present invention, from about one to six grams per quart, more preferably from 1.25 to 2.5 grams per quart, of tricalcium phosphate is employed in beverage compositions of the type described above. Unexpectedly, in these high acid, low pH beverages, tricalcium phosphate is found to be more effective in reducing tooth enamel demineralization than other calcium phosphates.

Tricalcium phosphate is available from a variety of commercial sources. There is presently no known criticality in the use of any particular commercial tricalcium phosphate; however, a food grade or purer product should be employed. It has been found advantageous to employ relatively finely divided particles for ease in handling during packaging and solubility in the beverage, but the particles should not be so fine as to present handling or solubility difficulties. A commercial tricalcium phosphate product having the following specifications has been found suitable:

| FORMULA: | $3Ca_3(PO_4)_2 \cdot Ca(OH)_2 \cdot 3H_2O$ | |
|---|---|---|
| MOLECULAR WEIGHT: | 1,058.7 | |
| CHEMICAL ANALYSIS: | $P_2O_5$ | 40.2% |
| | CaO | 51.6% |
| | Ignition Loss | 7.1% |
| | Titration Value (T.V.) | |
| | Ignited Basis | 137 |
| | $Ca_3PO_4$ (N.F. XI Test Method) | 95.0% |
| Trace Impurities: | $As_2O_3$ | 0.2 ppm |
| | F | 30.0 ppm |
| | Pb Less than | 1.0 ppm |
| Screening (USSS) (Wet Method): | Thru 325 Mesh | 96.7 |

The following Example is presented for the purpose of further illustrating the present invention and is not to be taken as limiting in any sense. Unless otherwise specified, all parts and percentages are by weight.

EXAMPLE

A two week feeding study was conducted with young adult caesarean-derived Sprague-Dawley rats using the following protocol:

The animals were fed a standard animal chow ad libitum throughout the study. They were housed individually in open-mesh, galvanized suspended cages in an air-conditioned room with the temperature controlled in the range of 75° F ± 3°F. Twelve rats were randomly assigned to each test group after blocking in body weight.

The following low pH test beverages were fed to these animals:

1. orange flavored beverage prepared from a dry concentrate as described in Example 3 of U.S. Pat. No. 3,658,552, but containing no tricalcium phosphate;

2. beverage (1) with 0.85 gm of monocalcium phosphate per quart;

3. beverage (1) with 0.85 gm of dicalcium phosphate per quart;

4. Reconstituted frozen orange juice;

5. beverage (1) with 0.85 gm of tricalcium phosphate per quart;

6. beverage (1) with 1.25 gm of tricalcium phosphate per quart; and 7. beverage (1) with 1.7 gm of tricalcium phosphate per quart.

As a control, a beverage (8), consisting of deionized water, was employed.

The rats were fed these beverages in the following manner:

Each day 20 ml of the beverages was offered to the animals in a two ounce glass jar from 2 P.M. until 9 A.M. the following day. Deionized water was given during the remaining five hours of the day.

After the two week feeding period the rats were sacrificed by decapitation and then the heads were defleshed by scrubbing with a toothbrush after an autoclaving procedure for 20 minutes at 15 pounds pressure.

The mandibular molars were stained by placing them in a 0.125% alcoholic solution of Alizarin Red S, rinsed with water and dried in a hot air oven at 150°F.

After the staining process was completed the lingual surfaces of the molars were scored for the extent of tooth enamel demineralization using a modification of the scoring scale developed by Restarski, *Science*, vol. 102: 404–405, 1945. Before scoring with the aid of a binocular microscope at 13x the molars were assigned random numbers.

The up-take of stain and the extent of ridging were used to evaluate the amount of tooth enamel demineralization for each mandibular molar using the following objective grading scale with an increase in severity:

0 — no demineralization, no detectable lingual stain
1 — slight demineralization — slight stain
2 — mild demineralization, moderate stain
3 — moderate demineralization, slight ridging, strong stain
4 — moderate demineralization, moderate ridging, ⅓ of dentin exposed
5 — strong demineralization, strong ridging, ⅓ to ⅔ of dentin exposed
6 — strong demineralization, very strong ridging, greater than ⅔ of dentin exposed.

The results are summarized in the table.

TABLE

| Beverage | Tooth Enamel Demineralization Score | % Decrease |
|---|---|---|
| 1 | 4.21 | — |
| 2 | 3.83 | 9.0 |
| 3 | 3.76 | 10.7 |
| 4 | 3.07 | 27.1 |
| 5 | 2.87 | 31.8 |
| 6 | 1.85 | 56.1 |
| 7 | 1.25 | 70.3 |
| 8 | 0.00 | 100.0 |

A number of modifications and variations of the present invention will be apparent to those skilled in the art upon reading the above disclosure. It is intended that all such modifications and variations be included within the scope of the present invention which is defined by the following claims.

What is claimed is:

1. A dry mix for forming a low pH beverage with water, wherein each quantity of mix for preparing one quart of beverage comprises: suitably effective amounts of flavoring and coloring, from 0.08 to 0.2 gram equivalents of a food acidulent, sufficient buffering material to achieve a final beverage pH of from 2.5 to 3.5, and from 1 to 6 grams of tricalcium phosphate.

2. A dry mix as defined in claim 1 wherein the acidulent is citric, malic or fumaric acid or a combination of these.

3. A dry mix as defined in claim 2 wherein citric acid is employed at a level of from 0.10 to 0.16 gram equivalents for each amount of dry mix employed to prepare one quart of beverage.

4. A dry mix as defined in claim 3 wherein the tricalcium phosphate is employed at a level of from 1.25 to 2.5 grams for each amount of dry mix employed to prepare one quart of beverage.

5. A dry mix as defined in claim 4 wherein the buffer is selected from sodium citrate, potassium citrate and combinations of these, and is employed in an amount sufficient to control the beverage pH to within the range of from 2.8 to 3.3.

6. In a method for preparing a low pH beverage which would have a normal tendency toward demineralizing tooth enamel, each quart of beverage containing suitably effective amounts of flavoring and coloring, from 0.08 to 0.2 gram equivalents of a food acidulent, and sufficient buffering material to achieve a final beverage pH of from 2.5 to 3.5, the improvement which comprises adding from 1 to 6 grams of tricalcium phosphate to each quart of beverage to thereby reduce the tendency of the beverage toward demineralizing tooth enamel.

7. A method according to claim 6 wherein the acidulent is citric, malic or fumaric acid or a combination of these.

8. A method as defined in claim 7 wherein citric acid is employed at a level of from 0.10 to 0.16 gram equivalents for each one quart of beverage.

9. A method as defined in claim 8 wherein the tricalcium phosphate is employed at a level of from 1.25 to 2.5 grams for each one quart of beverage.

10. A method as defined in claim 9 wherein the buffer is selected from sodium citrate, potassium citrate and a combination of these, and is employed in an amount sufficient to control the beverage pH to within the range of from 2.8 to 3.3.

* * * * *